US011839962B1

(12) United States Patent
Nichols

(10) Patent No.: US 11,839,962 B1
(45) Date of Patent: Dec. 12, 2023

(54) ROTARY TOOL FOR REMOTE POWER LINE OPERATIONS

(71) Applicant: Altec Industries, Inc., Birmingham, AL (US)

(72) Inventor: Robert Nichols, Saint Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 17/875,796

(22) Filed: Jul. 28, 2022

(51) Int. Cl.
*B25F 5/00* (2006.01)
*B25J 9/16* (2006.01)
*H02G 1/02* (2006.01)
*B25J 11/00* (2006.01)
*B25J 19/02* (2006.01)

(52) U.S. Cl.
CPC ............. *B25F 5/001* (2013.01); *B25J 9/1697* (2013.01); *B25J 11/005* (2013.01); *B25J 19/023* (2013.01); *H02G 1/02* (2013.01)

(58) Field of Classification Search
CPC ........................................................ B21F 7/00
See application file for complete search history.

(56) References Cited

U.S. PATENT DOCUMENTS

| | | | |
|---|---|---|---|
| 3,139,948 A | 7/1964 | Rorden | |
| 4,831,662 A | 5/1989 | Kuhn | |
| 5,196,998 A | 3/1993 | Fulton | |
| 6,250,588 B1 | 6/2001 | Numbers | |
| 6,325,749 B1 | 12/2001 | Inokuchi et al. | |
| 6,507,163 B1 | 1/2003 | Allen | |
| 7,224,382 B2 | 5/2007 | Baker | |
| 2003/0029215 A1* | 2/2003 | Latour | B21F 7/00 72/307 |
| 2003/0174286 A1 | 9/2003 | Trumbull | |
| 2006/0045294 A1 | 3/2006 | Smyth | |
| 2007/0192910 A1 | 8/2007 | Vu et al. | |
| 2011/0036605 A1* | 2/2011 | Leong | B25F 5/001 173/47 |

(Continued)

FOREIGN PATENT DOCUMENTS

JP     6285880 B2     9/2013

OTHER PUBLICATIONS

Faucher et al. "Ground operated teleoperation system for live power line maintenance" (Year: 1996).

(Continued)

*Primary Examiner* — Daniel Jeremy Leeds
(74) *Attorney, Agent, or Firm* — Erise IP, P.A.

(57) ABSTRACT

Rotary tools for operating on energized power lines are described herein. The rotary tool may be used to manipulate wire ties wrapped around the conductors and to clean the conductors. The rotary tool may comprise a planetary gear set. A ring gear may comprise a receiving portion through which an end of the wire tie is received and, as the ring gear rotates, the wire tie is fed through the receiving portion and unwound about the conductor. A spring-loaded rod assembly may also be used, having a rod that is kept proximal to the conductor by the spring. The rod may be inserted between the conductor and the wire tie and rotated along with the ring gear to unwind the wire tie. The rod may comprise wire bristles to abrade corrosive material off the conductor. The rotary tool may be remotely operated by a robotic unit.

20 Claims, 9 Drawing Sheets

(56) References Cited

U.S. PATENT DOCUMENTS

| | | | |
|---|---|---|---|
| 2013/0014852 A1* | 1/2013 | Hayden | B21F 7/00 |
| | | | 140/118 |
| 2014/0014637 A1 | 1/2014 | Hunt et al. | |
| 2015/0015708 A1 | 1/2015 | Collett et al. | |
| 2015/0312468 A1 | 10/2015 | Taylor et al. | |
| 2017/0340969 A1 | 11/2017 | Lim et al. | |
| 2018/0011681 A1 | 1/2018 | Kada | |
| 2018/0032130 A1 | 2/2018 | Meglan | |
| 2018/0037172 A1* | 2/2018 | Nelson | F16M 11/2092 |
| 2018/0057322 A1 | 3/2018 | Schiller | |
| 2018/0243921 A1 | 8/2018 | Hashimoto et al. | |
| 2018/0313885 A1 | 11/2018 | Bilic et al. | |
| 2019/0257097 A1 | 8/2019 | Kawai et al. | |
| 2020/0139227 A1 | 5/2020 | Mikhailov | |
| 2021/0020337 A1 | 1/2021 | Ciapala et al. | |
| 2022/0288669 A1* | 9/2022 | Goodall | B21F 11/00 |

OTHER PUBLICATIONS

Aracil et al. "ROBTET a new teleoperated system for live-line maintenance" (Year: 1995).

Du et al. "A teleoperated robotic hot stick platform for the overhead live powerline maintenance tasks" (Year: 2019).

Aracil et al. "Advanced Teleoperated System for Live Power Line Maintenance" (Year: 2001).

* cited by examiner

ROTARY TOOL FOR REMOTE POWER LINE OPERATIONS

BACKGROUND

1. Field

Embodiments of the present teachings relate to tools for operating on power lines. More specifically, embodiments of the present teachings relate to a remotely operated rotary tool for operating on power lines.

2. Related Art

Utility workers commonly utilize an aerial device to reach remote locations, such as overhead power lines, for installation, repair, and/or maintenance of electric power components. Due to the inherent dangers with operating on energized power lines and at high heights, it is desired to perform power line maintenance in a safer manner by removing the lineman from near the power line to a safe location away from the power line.

Wire ties are used to couple conductors to pole top insulators on power lines. Whenever maintenance needs to be performed on the conductors, the wire ties must be removed. Typically, the lineman uses a ring tool having an opening in which the wire tie is inserted, and the ring tool is then rotated about the conductor. As the wire tie is unwound, the unwound portion of the wire tie becomes physically separated from the conductor, while the wound portion is still in contact with the conductor such that the unwound portion is left dangling but still has a high voltage. This dangling high voltage section of wire tie presents a shock hazard and is easily and unpredictably blown by the wind, making it dangerous for lineman to manipulate wire ties on energized power lines.

What is needed is a rotary tool for manipulating wire ties. Further, what is needed is a rotary tool for manipulating wire ties that can be remotely operated.

SUMMARY

Embodiments of the disclosure solve the above-mentioned problems by providing a rotary tool for manipulating wire ties on live power lines. The rotary tool may be remotely controlled and robotically actuated to manipulate the wire tie. The rotary tool may comprise one or more slots for receiving a conductor therein. The rotary tool may comprise a drive system configured as a planetary gear set. In some embodiments, a ring gear of the planetary gear set comprises a receiving portion in which a free end of the wire tie is received. The receiving portion may rotate with the ring gear and about the conductor to unwind the wire tie therefrom. In some embodiments, the ring gear is coupled to a spring-loaded rod that is inserted between the conductor and the wire tie. The spring-loaded rod may rotate with the ring gear and, by staying between the conductor and the wire tie, unwinds the wire tie from the conductor. The spring-loaded rod may comprise external wire bristles to abrade corrosive material off the conductor.

In a first embodiment, the techniques described herein relate to a system for remotely manipulating wire ties on energized power lines, the system including a robot unit mounted to a boom assembly. The robot unit including at least one robotic arm for performing an action, and at least one camera for capturing visual information, and a rotary tool driven by the robot unit. The rotary tool including a housing coupled to the at least one robotic arm, the housing including a slot for receiving a conductor therein, and a drive system coupled to the housing, the drive system including a planetary gear set, wherein when the robot unit drives the drive system, a ring gear of the planetary gear set is rotated around the conductor to rotate a wire tie about the conductor.

In a second embodiment, the techniques described herein relate to the system described in embodiment one, wherein the ring gear includes a first arm coupled to a rod and a second arm coupled to a spring, wherein the rod is configured to be inserted between the conductor and the wire tie, and wherein the spring is coupled to the rod to spring-load the rod to keep the rod proximal to the conductor as the ring gear rotates.

In a third embodiment, the techniques described herein relate to the system described in embodiments one and two, wherein the at least one robotic arm includes a first robotic arm and a second robotic arm, wherein the first robotic arm is coupled to the rotary tool, and wherein the second robotic arm includes a gripper to manipulate the wire tie for inserting the rod between the conductor and the wire tie.

In a fourth embodiment, the techniques described herein relate to the system described in embodiments one through three, wherein the rod includes an abrasive material on an exterior thereof for removing corrosion from the conductor.

In a fifth embodiment, the techniques described herein relate to the system described in any of embodiments one through four, wherein the ring gear includes a receiving portion having a hole therethrough and extending from a perimeter of the ring gear, and wherein the receiving portion receives a free end of the wire tie and is rotated with the ring gear to unwind the wire tie from the conductor.

In a sixth embodiment, the techniques described herein relate to the system described in any of embodiments one through five, wherein the receiving portion is configured to feed an unwound portion of the wire tie to a cutter, wherein the cutter cuts the unwound portion of the wire tie to remove the unwound portion of the wire tie from an energized portion of the wire tie.

In a seventh embodiment, the techniques described herein relate to the system described in any of embodiments one through six, wherein the receiving portion is configured to feed an unwound portion of the wire tie to a die, wherein the die bends the unwound portion of the wire tie to form the unwound portion of the wire tie into a coil.

In an eight embodiment, the techniques described herein relate to the system described in any of embodiments one through seven, wherein the drive system is driven by one of an impact drill or an integrated motor.

In a ninth embodiment, the techniques described herein relate to a rotary tool for remotely operating on live power lines. The rotary tool comprises a housing including a first slot for receiving a conductor therein, a drive system coupled to the housing, the drive system including: a sun gear configured to be coupled to a motor, a plurality of planetary gears meshed with the sun gear, and a ring gear meshed with the plurality of planetary gears; and a spring-loaded rod coupled to the ring gear, wherein the spring-loaded rod is configured to be inserted between the conductor and a wire tie wound around the conductor, and wherein when the drive system is driven by the motor, the ring gear is rotated by the sun gear and drives the plurality of planetary gears, thereby rotating the spring-loaded rod to unwind the wire tie from the conductor.

In a tenth embodiment, the techniques described herein relate to the rotary tool described in embodiment nine, wherein the housing further includes a cutter for cutting an unwound portion of the wire tie as the wire tie is unwound from the conductor.

In an eleventh embodiment, the techniques described herein relate to the rotary tool described in embodiments nine and ten, wherein the housing further includes a die, the die formed to bend the wire tie into a coil as the wire tie is fed through the die.

In a twelfth embodiment, the techniques described herein relate to the rotary tool described in any of embodiments nine through eleven, wherein a surface of the die includes an angle of about ninety degrees.

In a thirteenth embodiment, the techniques described herein relate to the rotary tool described in any of embodiments nine through twelve, wherein the ring gear includes a first arm and a second arm extending from a perimeter thereof, wherein the spring-loaded rod is coupled to the first arm, wherein a spring is coupled to the second arm, and wherein the spring extends from the second arm and couples to the spring-loaded rod to keep the spring-loaded rod in contact with the conductor as the ring gear rotates.

In a fourteenth embodiment, the techniques described herein relate to the rotary tool described in any of embodiments nine through thirteen, wherein the spring-loaded rod includes a plurality of wire bristles on an exterior surface thereof to clean the conductor.

In a fifteenth embodiment, the techniques described herein relate to a rotary tool for remotely operating on live power lines. The rotary tool includes a housing including a slot for receiving a conductor therein, a drive system, the drive system including: a sun gear; a plurality of planetary gears meshed with the sun gear, wherein the plurality of planetary gears is driven by the sun gear; and a ring gear meshed with and driven by the plurality of planetary gears, wherein the ring gear includes a receiving portion for receiving a free end of a wire tie therein, and wherein actuation of the drive system causes the ring gear to rotate around the conductor, thereby unwinding the wire tie from the conductor.

In a sixteenth embodiment, the techniques described herein relate to the rotary tool described in embodiment fifteen, wherein the housing is configured to couple to a first arm of a robotic unit.

In a seventeenth embodiment, the techniques described herein relate to the rotary tool described in embodiments fifteen and sixteen, wherein the plurality of planetary gears is in a range of two to eight.

In an eighteenth embodiment, the techniques described herein relate to the rotary tool described in any of embodiments fifteen through seventeen, wherein the housing includes a cutter disposed proximal to the receiving portion, wherein the cutter cuts the wire tie after the wire tie is fed through the receiving portion.

In a nineteenth embodiment, the techniques described herein relate to the rotary tool described in any of embodiments fifteen through eighteen, wherein the cutter is configured to make one cut per revolution of the ring gear.

In a twentieth embodiment, the techniques described herein relate to the rotary tool described in any of embodiments fifteen through nineteen, wherein the housing includes a die disposed proximal to the receiving portion, wherein the die forms the wire tie into a bend after the wire tie is fed through the receiving portion.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments of the present teachings are described in detail below with reference to the attached drawing figures, wherein.

Figure 1:
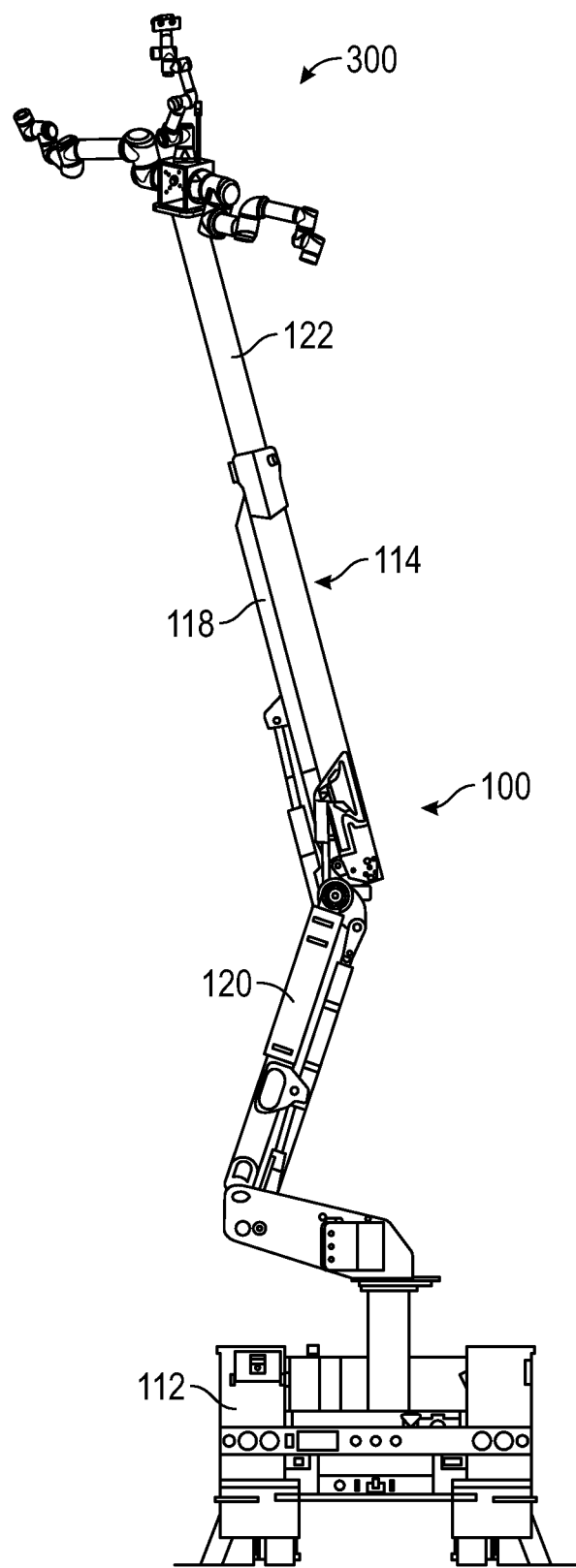
FIG. 1 is an aerial device for some embodiments.

The drawing figures do not limit the present teachings to the specific embodiments disclosed and described herein. The drawings are not necessarily to scale, emphasis instead being placed upon clearly illustrating the principles of the present teachings.

DETAILED DESCRIPTION

The following detailed description references the accompanying drawings that illustrate specific embodiments in which the present teachings can be practiced. The embodiments are intended to describe aspects of the present teachings in sufficient detail to enable those skilled in the art to practice the present teachings. Other embodiments can be utilized, and changes can be made without departing from the scope of the present teachings. The following detailed description is, therefore, not to be taken in a limiting sense. The scope of the present teachings is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments discussed herein are generally directed to a rotary tool for remotely operating on live power lines to manipulate a wire tire on a conductor of the power line. The rotary tool may comprise at least one slot for receiving the conductor therein. A planetary gear system may drive a ring gear to rotate the wire tie about the conductor. In some embodiments, the wire tie is received through a hole on a perimeter of the ring gear. In some embodiments, a spring-loaded rod is inserted between the conductor and the wire tie to manipulate the wire. The rotary tool may attach to a robotic arm of a unit assembly disposed at a distal end of a boom. An operator may control the rotary tool via the robotic unit using an input system, such as a virtual reality input system. Thus, the operator may manipulate the wire tie on a live power line without any risk of harm to the operator.

In some embodiments, the spring-loaded rod comprises a wire brush for cleaning conductors. Over time, corrosive material may build up on conductors, and it is desirable to clean the corrosive material off the conductors when performing operations thereon. As such, by adding wire brush material (e.g., stainless steel bristles) to an exterior of the spring-loaded rod, as the spring-loaded rod spins around the conductor, the wire brush may clean any corrosive material present on the conductor to prepare the conductor for a jump.

Exemplary Aerial Device

FIG. 1 depicts an aerial device 100 of some embodiments. The aerial device 100 comprises a utility vehicle 112, a boom assembly 114, and a remote assembly system 300. The boom assembly 114 comprises a boom 118 having a boom proximal end 120 and a boom distal end 122. In some embodiments, the boom 118 is one of a telescoping boom 118 or an articulating boom 118. The boom assembly 114 may be attached to the utility vehicle 112 at the boom proximal end 120. The remote assembly system 300 may be secured to the boom distal end 122, such that the remote assembly system 300 is supported by the boom assembly 114. In some embodiments, and as described in greater detail below, the remote assembly system 300 may comprise at least a robot unit adapted for performing telecommunications repair, power line repair, general repair work, or other actions that may be performed by a robot. For example, the robot unit may comprise one or more utility tools for performing actions such as manipulating wire ties. The robot unit may also comprise utility tools for sawing, cutting, screwing, wiring, or other actions associated with repair work. In some embodiments, the boom 118 is used to position the remote assembly system 300 in a remote location, such as, for example adjacent to an energized power line.

As described herein, the robot unit may be controlled remotely by an operator to perform actions, such as power line repair work. For example, the robot unit may control the rotary tool described in embodiments herein. Through such remote control, the operator is removed from any potentially dangerous situations. To provide the operator with visual, sensory, and other information, the robot unit may further comprise a sensory capturing system comprising at least a camera and a three-dimensional depth camera. Video information may be provided to the operator through a virtual reality ("VR") headset and the operator may issue commands through joysticks or other controllers to instruct the robot unit to perform an action. To aid the operator and/or the robot unit in performing actions efficiently and correctly, three-dimensional depth information may be captured by the three-dimensional depth camera for generating a three-dimensional representation of the field of view at a computer. Accordingly, the computer can receive instructions, compare the instructions to the three-dimensional representation, and cause the robot unit to perform an action based on the instructions and the three-dimensional representation. To further aid in providing a realistic and immersive experience to the operator, the robot unit may comprise a six degree-of-freedom ("DOF") camera mount for mimicking or replicating the movement of the operator. Accordingly, in addition to movement in the x, y, and z planes, the robot unit can further control pitch, yaw, and roll of the camera mount. However, it will be appreciated that particular embodiments and applications of the present teachings may vary, including any of the examples provided herein. For example, the present teachings may be utilized in a variety of applications, including but not limited to military applications, construction applications, rescue applications, health and safety applications or other applications that robotics may be utilized. Accordingly, it will be appreciated that specific embodiments or details provided herein are intended to be illustrative, rather than limiting.

Exemplary System Architecture

Figure 2:
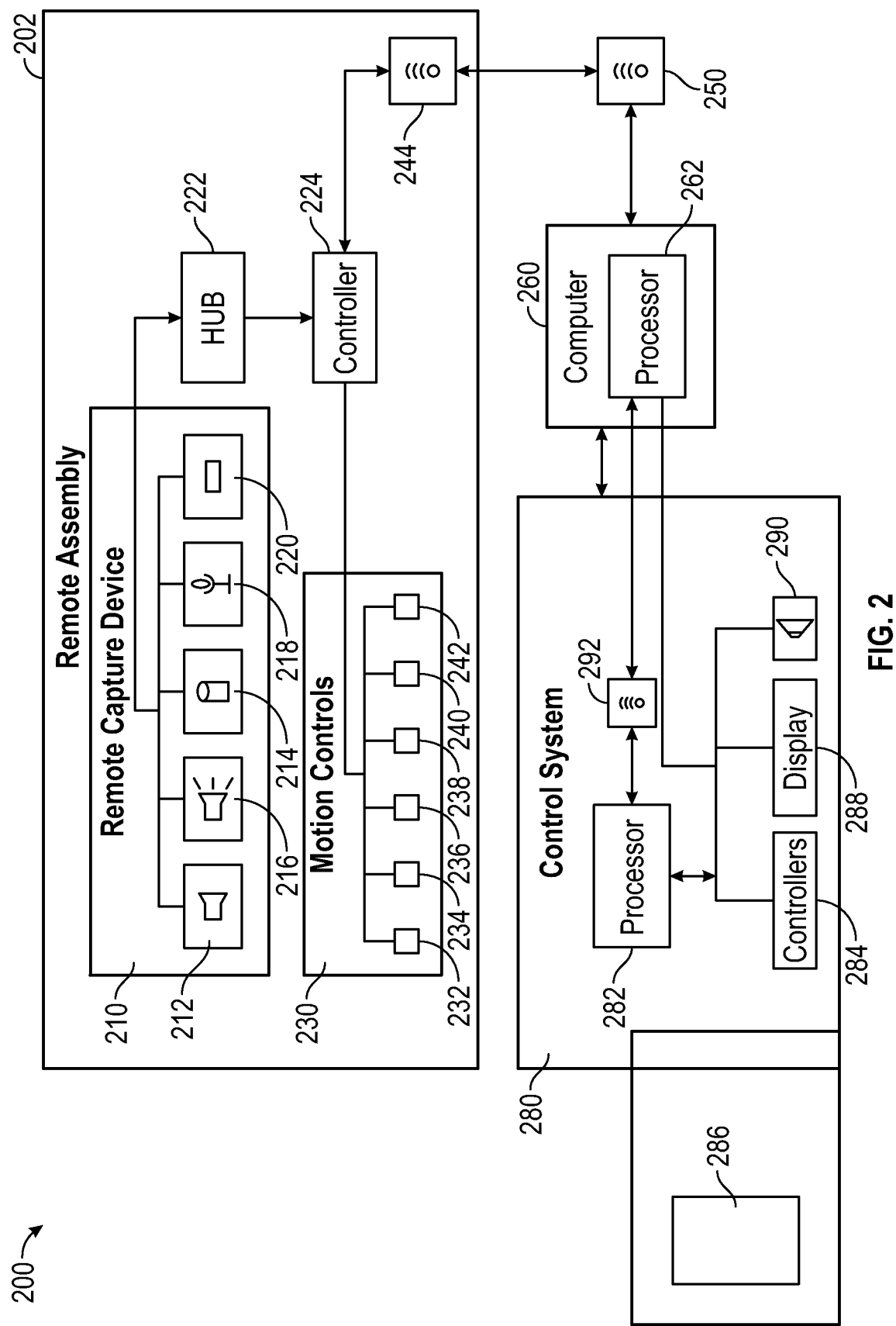
FIG. 2 is an exemplary system architecture of a robot unit and manual controls for some embodiments.

FIG. 2 depicts an exemplary block diagram 200 related to embodiments of the present teachings. In some embodiments, the remote assembly system 300 comprises various assemblies, sub-assemblies, parts, or components for capturing sensory information and/or for performing actions, such as repair work in a telecommunication setting. The remote assembly system 300 may comprise various circuitry, parts, or other components for capturing sensory information, including video, three-dimensional depth information, audio, and other sensory data. Further, the remote assembly system 300 may comprise a manually controlled or autonomous robot unit that may be positioned at the end of the boom assembly 114 for interacting with a work site to perform one or more tasks. For example, as described above, in many real-life scenarios, tasks to be performed may not be discovered until reaching the job site, and accordingly, the robot unit may comprise a variety of tools, features, or functions to respond to a variety of different tasks. Additionally, as described in greater detail below, the remote robot assembly may further comprise one or more parts, components, or features for providing an operator with sensory information, providing the operator with additional information about the job site to improve efficiency, efficacy, and/or safety of both the remote assembly system 300 and the operator.

As depicted in the block diagram 200, a remote assembly 202 comprises at least a remote capture device 210, a computer 260, and a control system 280. In some embodiments, and as described in greater detail herein, the remote capture device 210 may be a device configured and adapted for the capturing of sensory information and may be positioned on a robot unit for the capturing of sensory information that may be utilized by computer 260, to present information to an operator via control system 280, among other purposes. FIG. 2 depicts exemplary sensors, cameras, and other apparatuses that may be utilized by remote capture device 210 for the capturing of sensory information. As described in greater detail below, remote capture device 210 may be mounted or positioned on a selectively movable mount or portion of a robot unit. For example, the robot unit may be a robot unit positioned at the end of a boom assembly for aerial applications. However, remote capture device 210 may also be used with a robot unit that is not attached on a boom assembly, and for example, may be utilized with a robot unit for ground application or attached to a mechanical arm or an aerial drone. Accordingly, via the robot unit, sensory information may be captured by remote capture device 210.

Through selective inputs, including both manually inputted instructions and/or automated instructions, remote capture device 210 may capture video, still images, three-dimensional depth information, audio, electrical conductivity, voltage, among other information that may be captured by a sensor or recording device. For example, remote capture device 210 may comprise at least one camera 212 for the capturing of video or still images (collectively, "video"). The at least one camera 212 may be a camera positioned on remote capture device 210 for the capturing of video within a selected field of view. The resolution of the video captured by camera 212 may vary, but in some embodiments, camera 212 may be a camera configured for capturing in at least 720p resolution but may capture in higher resolution including but not limited to 1080p, 2K, 3K, 4K, or 8K resolution. However, it will be appreciated that the camera 212 may be any currently known or yet to be discovered camera for capturing video. Video captured from camera 212 may be stored locally at remote capture device 210 at a local memory 214. The storing of video at local memory 214 may aid in providing a failsafe or backup storage of captured video in the event of a transmission or upload failure. Further, the storing of video at local memory 214 may aid in situations of poor wireless connection or if a direct line becomes loose or interrupted, preventing the immediate transmission of captured video. Optionally or additionally, video captured from camera 212 may be transmitted to computer 260 for processing, analyzing, storage, and/or for later transmitting to control system 280. In further embodiments, video captured from camera 212 may be directly transmitted to control system 280 for processing.

In some embodiments, remote capture device 210 may further comprise at least one three-dimensional camera 216 or other device configured for capturing three-dimensional depth information. As described in greater detail below, the three-dimensional depth camera 216 may be utilized for capturing three-dimensional depth information within a field of view for creating a point cloud, 3-D model, or other digital representation of an object or area scanned or viewed by the three-dimensional camera 216. Three-dimensional camera 216 may be operated in conjunction with, or independent from camera 212 or other components or parts of remote assembly 202 and/or remote capture device 210. As described in greater detail below, in response to instructions or an input, three-dimensional camera 216 may begin capturing three-dimensional depth information about an object or area within a field of view. Like the captured video with respect to camera 212, the three-dimensional depth information captured by three-dimensional camera 216 may be saved locally at memory 214. In some embodiments, remote capture device 210 may comprise a separate memory 214 for video captured by camera 212 and a separate memory 214 for three-dimensional information captured by three-dimensional camera 216. As described in greater detail below, remote capture device 210 may comprise a microphone 218 and/or at least one sensor 220 for capturing additional sensory information. Accordingly, in some embodiments, a separate and distinct memory 214 may be used for each sensory capture device (i.e., camera 212, three-dimensional camera 216, microphone 218, and/or sensor 220). In further embodiments, remote capture device 210 may comprise a single memory 214 for the storing of all captured sensory information. As described above and in further embodiments, three-dimensional information may be directly sent to computer 260 in addition to or instead of storing locally at memory 214.

In addition to capturing video and/or three-dimensional information, it may also be advantageous for remote capture device 210 to capture additional sensory information that may be presented to an operator or processed by computer 260. For example, in certain scenarios it may be advantageous for remote capture device 210 to capture audio via at least one microphone 218. Continuing with the running example, a remote assembly 202 for use with telecommunications repair may utilize audio information for diagnostic or safety purposes. For example, audio information may capture the sounds of the job site and the audio information may be processed to determine if a job site is safe. Accordingly, in some embodiments, remote capture device 210 may comprise at least one microphone 218 for the capturing of audio information. Similar to the video and three-dimensional information as described above, captured audio information may be stored locally at a memory 214 and/or transmitted to a computer 260 and/or control system 280.

Similar to audio information, remote capture device 210 may further comprise one or more sensors 220 for the capturing of additional sensory information, metrics, or data. For example, continuing with the running example, the remote capture device 210 may be used with a remote assembly 202 positioned at the end of boom assembly 114 for telecommunication or power line work. In such a work application, the remote assembly 202 may be working on or near live power lines or other conductive lines transferring electricity. Accordingly, in some embodiments, remote capture device 210 may comprise at least one sensor 220 configured as an electricity sensor for determining whether a cable or power line has electricity running through it. However, it will be appreciated that remote capture device 210 may comprise additional sensors 220 configured and adapted for providing remote capture device and/or remote assembly 202 with additional information. By way of a non-limiting example, sensor 220 may comprise any of the following sensors: a gyroscope, an accelerometer, a thermometer, a barometer, a light emitter, a voltage detector, a weight-detection sensor, QR reader, magnetometers, pose sensor, rotary encoder, among other sensors that may be utilized in various applications of remote assembly 202.

For example, in some embodiments, at least one sensor 220 may be adapted and configured as a sensor for estimating the weight of an object. As described in greater detail below with respect to FIG. 3, in some embodiments, comprises a remote assembly comprising a robot unit to perform fine tuning or other dexterous actions and a heavy load bearing utility arm for holding and moving heavy loads. To aid an operator in determining whether the robot unit for fine tuning work can safely hold or manipulate an object, at least one sensor 220 may be a weight estimator. For example, the weight estimator may utilize point cloud weight estimation to estimate the weight of an object. The weight estimator may capture various images of an object for the generation of a point cloud based on the object. By way of non-limiting example, the weight estimator may capture an image of a powerline transformer. The generated point cloud image may determine the transformer comprises a diameter of 13.4" and a height of 15.8." Based on this information, a determination may be made that the transformer comprises a weight of 472.9 Lbs. This information may be presented to computer 260 or an operator in the manner described below, and the computer 260 and/or the operator may make a determination as to whether the robot unit or the heavy load bearing utility arm can safely hold and move an object.

Further, in some embodiments, at least one sensor 220 may be a quick response ("QR") reader for reading QR codes. For example, in some applications, remote assembly 202 may be applied in a scenario in which objects or assets may be applied with or comprise a QR code. Through utilization of a QR reader, information about the object or asset may be quickly ascertained and provided to computer 260 and/or an operator. Non-limiting examples of information that may be obtained through a QR reader may be the BIM specifications of an object, such as weight, size, lifting points, ratings, etc. It should be understood however, that any information about the object or asset may be ascertained through QR reading.

It should be understood that in some embodiments, remote assembly 202 may comprise a plurality of remote capture devices 210. Further, each of the remote capture devices 210 in the plurality of remote capture devices 210 may comprise varying components (I.e., camera 212, three-dimensional camera 216, sensor 220, etc.). Even further, each remote capture device 210 in the plurality of remote capture devices 210 may comprise uniform components. For example, as described above, remote capture device 210 may be used with a boom-mounted robot unit comprising a camera mount and at least one utility arm. A remote capture device 210 comprising camera 212, three-dimensional camera 216, and microphone 218 may be paired or positioned on the camera mount. Simultaneously, a second remote capture device 210 comprising a sensor 220 for detecting an electric voltage and a microphone 218 may be paired or incorporated into the utility arm.

In some embodiments, the remote assembly 202 further comprises at least one digital Hub 222. The digital Hub 222 may receive the captured sensory information from remote capture device 210 and convert the captured sensory information into a format suitable for transmitting to computer 260 and/or control system 280. In some embodiments, the digital Hub 222 is a USB Hub, such as, for example, a USB 3.0. In further embodiments, sensory information may be captured using Ethernet cameras or Ethernet coupled capture devices. Accordingly, in some embodiments, digital hub 222 may be replaced, substituted, or used in conjunction with an ethernet switch. It should be understood that sensory information may be captured in a variety of different formats. Accordingly, remote assembly 202 may utilize any hardware or software for receiving, analyzing, and/or transmitting sensory information.

As further depicted in FIG. 2, remote assembly 202 may further comprise a controller 224. In some embodiments, controller 224 may be a processor or other circuitry or computer hardware for receiving commands or instructions from control system 280 and/or computer 260 and for relaying or providing commands to remote capture device 210 and/or motion controls 230. Accordingly, in some embodiments, instructions, or commands from controller 224 may be sent to remote capture device 210. For example, instructions sent from controller 224 to remote capture device 210 may include instructions to begin recording video via camera 212. However, it will be appreciated that instructions sent from controller 224 may cause any of the components of remote capture device 210 to begin capturing sensory information, including but not limited to three-dimensional information, audio information, or other sensory information captured by any of the sensors 220 of remote capture device 210. Additionally, controller 224 may be used to send instructions to cause remote assembly 202, remote capture device 210, and/or motion controls 230 to perform other actions corresponding to the instructions. For example, instructions from controller 224 may instruct remote capture device 210 to store captured sensory information on memory 214. Additionally, instructions from controller 224 may be sent to motion controls 230 to instruct remote assembly 202 to perform a movement. Further, controller 224 may be in communication with transceiver 244 for communicating with computer 260 and/or control system 280 to send sensory information or other data or information to computer 260 and/or control system 280. Similarly, controller 224 may further be configured for receiving instructions, commands, or other information from computer 260 and/or control system 280. It should be understood that in further embodiments, controller 224 is not required to be directly coupled or incorporated into remote assembly 202. For example, remote assembly 202 may be incorporated into or be a component of a computer 260 and/or control system 280. Accordingly, in some embodiments, controller 224 may be incorporated into or directly paired with computer 260 and/or control system 280. In such embodiments, instructions, commands, or other communications may be sent from controller 224 to remote assembly 202. Remote assembly 202 may comprise computer hardware capable of receiving the transmitted instructions, commands, or communications from controller 224. For example, in some embodiments, it may be advantageous for controller 224 to be incorporated into a high-powered computing system that can transmit information to remote assembly 202.

As further depicted in the block diagram of FIG. 2 and in some embodiments, remote assembly 202 may further comprise motion controls 230. Motion controls 230 may be configured and adapted for controlling the movement of remote assembly 202, including any utility arms or camera mounts as described in greater detail below. In some embodiments, remote assembly 202 may comprise a 6 DOF robot unit configured with utility arms and/or camera mounts that can move with 6 DOF. Accordingly, motion controls 230 may be configured to provide instructions or commands to remote assembly 202 to move in 6 DOF. In some embodiments, motion controls may comprise x-axis control 232, y-axis control 234, z-axis control 236, pitch control 238, yaw control 240, and/or roll control 242 for moving remote assembly 202 with 6 DOF. It will be appreciated however, that remote assembly 202 may comprise varying designs, and in some embodiments, may move in fewer than 6 DOF. Accordingly, in further embodiments, motion controls 230 may comprise controls configured and adapted for moving remote assembly 202 in an appropriate number of planes.

As described above, motion controls 230 may be in communication with controller 224. Instructions or commands from controller 224 may be sent to motion controls 230. Upon receipt of the instructions, the corresponding controls 232, 234, 236, 238, 240, and/or 242 may be instructed to cause movement of the remote assembly 202 based on the received instructions. As described above, one or more arms or limbs of remote assembly 202 may be configured to move with 6 DOF. Based on the instructions, the corresponding motion controls 230 may cause movement of the remote assembly 202 to correspond to the instructions.

As described above, remote assembly 202 may be communicatively coupled to computer 260. In some embodiments, computer 260 may be directly coupled to remote assembly 202, such that computer 260 and remote assembly 202 are a combined system. For example, computer 260 may be directly installed into a frame or body of remote assembly 202. Accordingly, remote assembly 202 and computer 260 may be in direct communication through cables or other direct methods. In further embodiments, computer 260 may be located external to remote assembly 202. When located externally, remote assembly 202 and computer 260 may nevertheless be communicatively coupled. For example, in some embodiments, remote assembly 202 and computer 260 may be coupled through a physical connection such as an Ethernet cable or USB cable. In further embodiments, remote assembly 202 and computer 260 may be coupled through a wireless connection, such as Wi-Fi, BLUETOOTH®, cellular connection, or another wireless connection. In embodiments in which computer 260 and remote assembly 202 are connected through a wireless connection, transceiver 244 may communicate with another transceiver 250 coupled or otherwise in communication with computer 260.

In some embodiments, computer 260 may receive and process sensory information captured by remote capture device 210 of remote assembly 202. Accordingly, computer 260 may comprise at least a processor 262 for executing commands, which may include instructions for processing, analyzing, or utilizing captured sensory information. For example, as described in greater detail below, computer 260 may utilize captured three-dimensional information to generate a point-cloud, three-dimensional model, or other digital representation of an object or area captured by remote capture device 210. In further embodiments, computer 260 may be in communication with one or more databases or data storages. For example, computer 260 may be in communication with a database comprising information directed to product or object information in a telecommunication or powerline setting. This may be particularly beneficial for obtaining information about particular objects or products that may be encountered in the application of various embodiments. For example, described above, remote assembly 202 may comprise a weight estimator utilizing a point cloud for estimating weight of an object. Computer 260 may utilize the data obtained by weight estimator in making an estimation about the weight of the object. In further embodiments and as described above, remote assembly 202 may comprise a QR reader for identifying assets or objects. Once a QR code is scanned, computer 260 may access the storage or database to identify information about the asset or object.

In some embodiments, control system 280 may be an interface, apparatus, or system providing a user with an interactive medium for interacting with computer 260 and/or remote assembly 202. For example, in some embodiments, control system 280 may comprise at least a processor 282, at least one controller 284, at least one display 288, at least one sensor 290, and at least one transceiver 292. As described in greater detail below, some embodiments of the present teachings provide for a method of controlling remote assembly 202 from a remote location. Continuing with the running example, telecommunications repair or power line repair sometimes occurs during or immediately after a severe weather storm. This type of scenario can be wrought with dangers such as exposed and live power lines, high winds, lightning, and other dangers that pose a risk to human workers. Accordingly, it may be advantageous for an operator of remote assembly 202 to control remote assembly 202 in a safe location, such as in a work truck or building away from the job site. Accordingly, control system 280 may comprise at least one interfacing controller 284, providing an interactive means for a user to input commands or instructions for controlling or manipulating remote assembly 202. Controller 284 may be any interface for inputting commands or instructions that can be transmitted and processed by a computer or other hardware. By way of non-limiting example, controller 284 may comprise hand-held motion control controllers. As described in greater detail below, the motion control controllers may be beneficial for an operator to perform specific movements or actions that can be captured and relayed to remote assembly 202 to perform. Through the use of motion-control controllers, an operator may be provided with a sensory effect similar to being at the job site and performing the actions themselves. However, controller 284 is not limited to motion controls and instead, controller 284 may be any interface for an operator to input instructions or commands for remote assembly 202. For example, in further embodiments, controller 284 may be a handheld controller, similar to that of a video game controller comprising thumb sticks, buttons, triggers, and/or other interfacing inputs. In further embodiments, controller 284 may comprise a joystick and button design. In even further embodiments, controller 284 may be a mouse and keyboard. In even further embodiments, controller 284 may be configured as a glove or interactive model of a hand, allowing an operator to perform native hand manipulations which may be captured and transmitted to remote assembly 202. In even further embodiments, controller 284 may comprise a camera component or other motion capture component for capturing the movement of an operator. For example, in addition to, or in place of a physical controller handled by the operator, a camera component may capture the movement of the operator. The captured movement may be transmitted to computer 260 for translation or mapping movement of remote assembly 202. Optionally, or additionally, motion capture aids, such as motion capture dots, may also be used for capturing movement of the operator. In further embodiments, operator inputs may further be captured through AC electromagnetic tracking. In even further embodiments, operator inputs may further be captured through an active force feedback imitative control. In even further embodiments, operator inputs may be further captured through a passive force feedback imitative control. It will be appreciated that the examples provided herein are intended to be illustrative, rather than limiting, and that controller 284 may be any apparatus or method of receiving instructions or an input from an operator or computer for autonomous control.

In some embodiments, control system 280 may further comprise a power medium 286 for powering one or more parts or components of control system, including for example controller 284, display 288, or the at least one sensor 290, or any combination thereof. In some embodiments, a single power medium may power all parts or components of control system 280. In further embodiments, individual parts, or components of control system 280 may comprise a separate and distinct power medium 286. For example, a first power medium 286 may be used for powering controller 284 and a second power medium 286 may be used for powering display 288. Power medium 286 may be any conventionally known power source for providing power to an electrical device, including but not limited to an internal power source such as a battery, or an external battery source such as an electrical outlet.

As further depicted in FIG. 2, control system 280 may further comprise at least one display 288. In some embodiments, display 288 may be a monitor, touchscreen, television screen, or any other display. In some embodiments, at least a portion of the captured sensory information from remote capture device 210 may be displayed on display 288 for an operator to view. For example, captured video may be displayed on display 288. Providing sensory information on display 288 may provide an operator with a more immersive feel when remotely operating remote assembly 202. Through a real-time video feed, an operator may experience the job site as if the operator is physically present, even if the operator is in a safe location miles away. Additionally, providing sensory information to an operator via display 288 may aid the operator in inputting instructions or commands via controller 284.

In some embodiments, control system 280 may further comprise at least one sensor 290, which may provide additional sensory affect to the operator and/or capture additional inputs that may be used by computer 260 to provide instructions to remote assembly 202. In some embodiments, one or more sensors may be combined with controller 284 and/or one or more sensors may be combined with display 288. For example, in some embodiments, sensor 290 may be at least one speaker or sound emitting device to provide the operator with audio information captured from remote capture device 210 or pre-recorded or pre-rendered audio. In further embodiments, the at least one sensor 290 may be one of an inclinometer, an accelerometer, a gyroscope, a light sensor, magnetometers, pose sensors, rotary encoders, or any other type of sensor 290 suitable to detect the viewing angle of the user or the movement, position, or angle of the operator's body.

In some embodiments, and as described in greater detail below, an operator may utilize controller 284, display 288, and the at least one sensor 290 to provide instructions to remote assembly 202, which may be analyzed and translated into instructions to cause remote assembly 202 to move or perform an action. As also described in greater detail below, an operator may input instructions or commands through control system 280. In some embodiments, inputs may be inputted or captured by a combination of controller 284 and display 288. For example, display 288 may be coupled to a head-mounted unit as described in greater detail below. An operator may move their head or torso with sensor 290 capturing the movement and/or viewing angle of the operator. The captured movement data or viewing angle may be sent to computer 260 via transceiver 292, and computer 260 may take the captured movement data or viewing angle and translate into instructions for causing remote assembly 202 to move and mimic or replicate the operator's movement and match the viewing angle of the operator.

Exemplary Hardware

Figure 3:
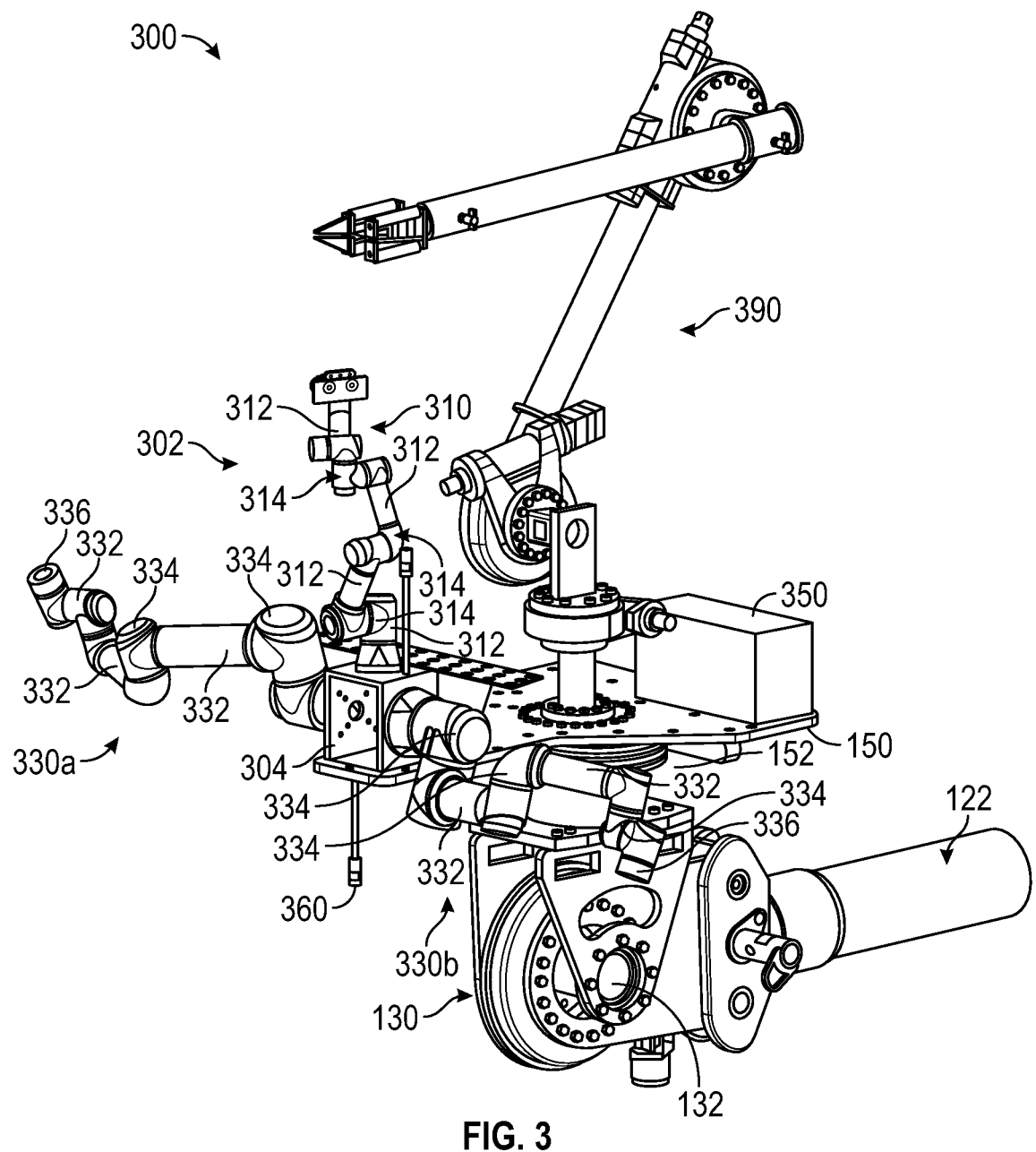
FIG. 3 is a remote assembly system for some embodiments.

FIG. 3 is an exemplary embodiment of a remote assembly system 300. In some embodiments, the remote assembly system 300 may comprise various assemblies, sub-assemblies, parts, or components, including but not limited to a robot unit 302 affixed at the end of a boom assembly 114. Further, the remote assembly system 300 may correspond to the remote assembly 202 as described above with respect to FIG. 2 and may comprise any and all of the components or parts as described above. In some embodiments, robot unit 302 may be configured and adapted to receive instructions from a computer or operator to perform a corresponding movement or action. In some embodiments, robot unit 302 may be a fully manually controlled robot, wherein the robot unit 302 will not perform a movement or action absent an instruction provided from an operator. In further embodiments, robot unit 302 may be a fully automated robot, wherein the robot unit 302 performs actions or movements based on pre-programmed instructions for automation. In even further embodiments, robot unit 302 may be a robot configured to respond to both manually inputted instructions and automated programming. The various movements or actions performed by robot unit 302 and described herein may be performed based on manually provided instructions and/or automated programming. Accordingly, embodiments of the present technology are anticipated to support fully autonomous control, fully manual control, or a hybrid (semi-autonomous) control wherein the operator is interacting with and providing manually provided inputs along with automated inputs to control remote assembly system 300.

As described above and as illustrated in FIG. 3, in some embodiments remote assembly system 300 may be positioned at the distal end 122 of boom assembly 114. As used herein, remote assembly system 300 and system 300 may be used interchangeably. As depicted, in some embodiments, distal end 122 of boom assembly 114 may comprise a pivot joint 130 comprising a motor 132. In some embodiments, pivot joint 130 may be used to change an angle or position of remote assembly system 300. In further embodiments, pivot joint 130 may be paired with a sensor, such as an inclinometer paired with a rotary encoder for closed-loop feedback, to aid in maintaining a leveled position of remote assembly system 300. However, pivot joint 130 may comprise any sensor, including but not limited to magnetometers, pose sensors, rotary encoders, among other sensors. As further depicted in FIG. 3, pivot joint 130 may further act as an attachment point between remote assembly system 300 and boom assembly 114. For example, base 150 may be coupled to pivot joint 130. Base 150 may be adapted and configured for receiving and coupling remote assembly system 300. Accordingly, through such coupling, remote assembly system 300 may be secured and attached to boom assembly 114. In some embodiments, base 150 may comprise a generally planar design for accepting and securing one or more assemblies, sub-assemblies, parts, or components of remote assembly system 300. Further, the size and shape of base 150 may vary, and may be dependent on the design of remote assembly system 300. Further, in some embodiments, base 150 may further comprise a motorized turntable 152. Motorized turntable 152 may be a power motor train system for rotating base 150. The rotation of base 150 may be advantageous for positioning remote assembly system 300 during use. In some embodiments, the various assemblies, sub-assemblies, parts, and/or components of system 300 may be adapted and configured to be selectively and removably attached to boom assembly 114. For example, utility vehicle 112 may be driven to a job location with a bare boom assembly 114, with the various assemblies, sub-assemblies, parts, and/or components of system 300 stored in or on utility vehicle 112. Once at the job site, system 300 may be assembled for use. This may be advantageous for protecting aspects of system 300 during transit.

In some embodiments, remote assembly system 300 may generally comprise a robot unit 302. Robot unit 302 may be a controllable robotics unit that can perform a range of movements and actions, such as performing repair work in a telecommunications setting. In some embodiments, and as described in greater detail below, robot unit 302 may be a 6 DOF robotics assembly, configured and adapted for mimicking the movement of an operator utilizing a VR controller. Particularly, through a 6-DOF configuration, robot unit 302 may substantially mimic the torso, neck, and arm movements of the operator. Through such movement, robot unit 302 may perform a greater range of movements and/or provide a more immersive experience to an operator than pre-existing systems.

In some embodiments, robot unit 302 may comprise a central hub 304. Central hub 304 may be a central housing or base, which may house a processor, a power source, circuitry, a wireless communication means among other electronics for robot unit 302, including the components described above with respect to FIG. 2. Additionally, central hub 304 may act as a coupling or attachment member, securing robot unit 302 to base 150. Even further, central hub 304 may also act as a receiving point for one or more parts or components of robot unit 302. For example, and as described below, robot unit 302 may comprise at least one utility arm and at least one camera mount. Accordingly, central hub 304 may receive and couple with the at least one utility arm and the at least one camera arm.

To collect sensory information, including but not limited to video and three-dimensional depth information, robot unit 302 may comprise at least one camera mount 310. Camera mount 310 may be a 6 DOF, selectively controllable robotic arm, that may couple to central hub 304. As described in greater detail below, robot unit 302 may receive movement instructions or commands from computer 260 that may cause camera mount 310 to move or change position. For example, camera mount 310 may correspond to a head mount or other capture apparatus to capture the viewing angle of an operator. Instructions or commands may be communicated to robot unit 302 causing camera mount 310 to move in a corresponding manner to match the viewing angle of the operator. To enhance the operator experience, camera mount 310 may comprise a plurality of camera mount segments 312 that may be separated by motorized pivotable joints 314. The number and size of camera mount segments and pivotable joints 314 may vary depending on the embodiments and application of robot unit 302. Generally, in response to an instruction or commands, one or more of the pivotable joints 314 may activate to rotate or move camera mount 310. In some embodiments, the pivotable joints 314 may be used to move camera mount 310 in the X-axis, Y-axis, Z-axis as well as control the roll, pitch, and yaw of the camera mount 310. Accordingly, through movement in the 6 DOF, camera mount 310 may mimic or replicate the viewing angle of the operator. As further depicted in FIG. 3, a distal end of camera mount 310 may further comprise a sensory capture device.

As described above, robot unit 302 may be adapted for performing repair work, maintenance work, or other similar situations, tasks, or actions. To perform these actions, robot unit 302 may comprise at least one utility arm. The depicted embodiment as illustrated in FIG. 3 illustrates an exemplary embodiment of robot unit 302 comprising two utility arms 330a, 330b. Like camera mount 310 as described above, each of utility arms 330a, 330b may comprise a plurality of utility arm segments 332 that may be separated by motorized pivotable joints 334. The number and size of utility mount segments 332 and pivotable joints 334 may vary depending on the embodiments and application of robot unit 302. Generally, in response to an instruction or commands, one or more of the pivotable joints 334 may activate to rotate or move utility arms 330a, 330b. In some embodiments, the pivotable joints 334 may be used to move utility arms 330a, 330b in the X-axis, Y-axis, Z-axis as well as control the roll, pitch, and yaw of utility arms 330a, 330b. Accordingly, through movement in the 6 DOF, each utility arm 330a, 330b may mimic or replicate the movement of an operator's arms and hands. In some embodiments, the distal ends 336 of utility arms 330a, 330b may comprise one or more tools, flanges, or other apparatus for performing an action such as repair work. In some embodiments, distal ends 336 may comprise an adapter or may be otherwise configured for accepting a tool. For example, distal ends 336 may be coupled to the below-described rotary tools 400, 500.

Remote assembly system 300 may further comprise a remote power source 350. In some embodiments, the remote power source 350 may be secured to the base 150. In further embodiments, remote power source 350 may be located within central hub 304. The remote power source 350 may be used to power camera mount 310, utility arm 330a, utility arm 330b, arm 390, or any combination thereof. Remote power source 350 may be an electric generator, batteries, or any other known power source.

In further embodiments, robot unit 302 may comprise one or more additional capture devices or sensors 360 for capturing additional information that may be analyzed and/or presented to a user or operator. For example, in some embodiments, robot unit 302 may comprise a thermometer or heat sensor for capturing heat information. In some embodiments, robot unit 302 may comprise an electrical sensor for capturing electrical data. For example, robot unit 302 may be used to work on power lines or in other scenarios involving live power lines or other electrically charged wires or circuitry. Accordingly, to avoid damage to the robot unit 302, the boom assembly 114, or the utility vehicle 112, at least one sensor 360 may be a sensor for detecting an electrical current. Additionally, robot unit 302 may comprise at least one sensor 360 that is at least one of an accelerometer, gyroscope, light sensor, or other sensors for detecting the positioning of camera mount 310, utility arm 330a, and/or utility arm 330b. As described in greater detail below, a sensor for detecting the positioning of robot unit 302 may aid in replicating or mimicking movement of an operator using motion controls.

In some embodiments, and as depicted in FIG. 3, in addition to robot unit 302, remote assembly system 300 may further comprise at least one heavy utility arm 390 or additional robotics assembly that may operate separately or in conjunction with robot unit 302. For example, in many robotics applications, a delicate balance is often considered when designing the features and capabilities of a robot. Typically, robotics adapted and configured for delicate work and fine adjustments are typically not capable of transporting or holding heavy loads. Conversely, robotics adapted and configured for holding or transporting heavy loads typically lack the structural components to perform delicate or fine-tuned actions. By way of non-limiting example, in telecommunication repairs, heavy parts may need to be lifted from the ground to a telecommunication pole. Lifting a heavy part may require a robotic system configured for transporting heavy loads. However, once in position, the part may need a robotic system configured for delicate or sophisticated operations to install the part in position. In some embodiments, robot unit 302 may be configured and adapted for performing movements or actions directed to sophisticated, delicate, or fine-tuning work, such as manipulating wire, cutting wire, loosening screws and bolts. In some embodiments, 300 may comprise at least one utility arm 390 for holding or transporting heavy loads that may be too heavy for robot unit 302 to safely hold and transport. Accordingly, through the combination of robot unit 302 and utility arm 390, remote assembly system 300 may perform both dexterous actions and load-bearing actions.

Rotary Tool

Figure 4A:
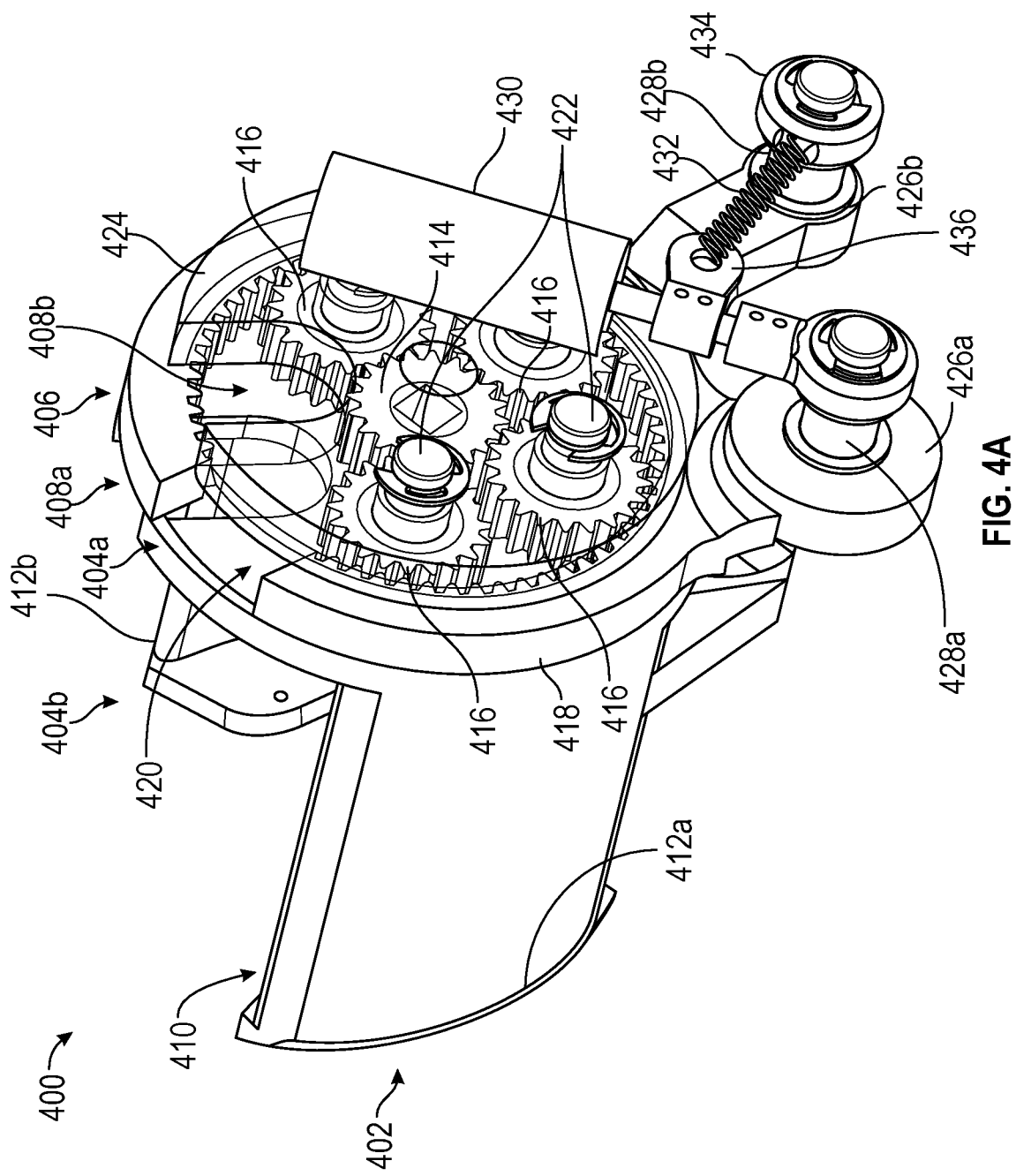
FIG. 4A illustrates a perspective view of a rotary tool for some embodiments.

FIG. 4A illustrates a perspective view of a rotary tool 400 for some embodiments. Rotary tool 400 may be used with remote assembly system 300, for example. Rotary tool 400 may be configured to attach to robot unit 302 (e.g., on an arm 330a, 330b) for operating remotely on live power lines. In some embodiments, the robot unit 302 operates a drill (e.g., an impact drill) that can couple to and power rotary tool 400. In some embodiments, rotary tool 400 is a stand-alone unit and may be powered by an integrated motor, for example. The integrated motor may comprise a gearbox and drive the drive system (discussed below). Rotary tool 400 may be used to manipulate wire ties on conductors. Often, a lineman working on live power lines will need to unwind a wire tie from a conductor to remove the conductor from a pole top or to jump from a first conductor to a second conductor, for example. Because the energized power line is at a high voltage and, therefore, the wire tie is at the same high voltage, such an operation is dangerous to the operator due to the electrocution risk. Furthermore, unwinding the wire tie by hand can be a slow and cumbersome task. Thus, it is desirable to remotely unwind the wire tie to reduce the risk of injury and to increase the speed of removing wire ties. Furthermore, when operating on power lines using remote robotic systems, it would be advantageous for the robotic system to be able to unwind wire ties from the conductors.

Figure 4B:
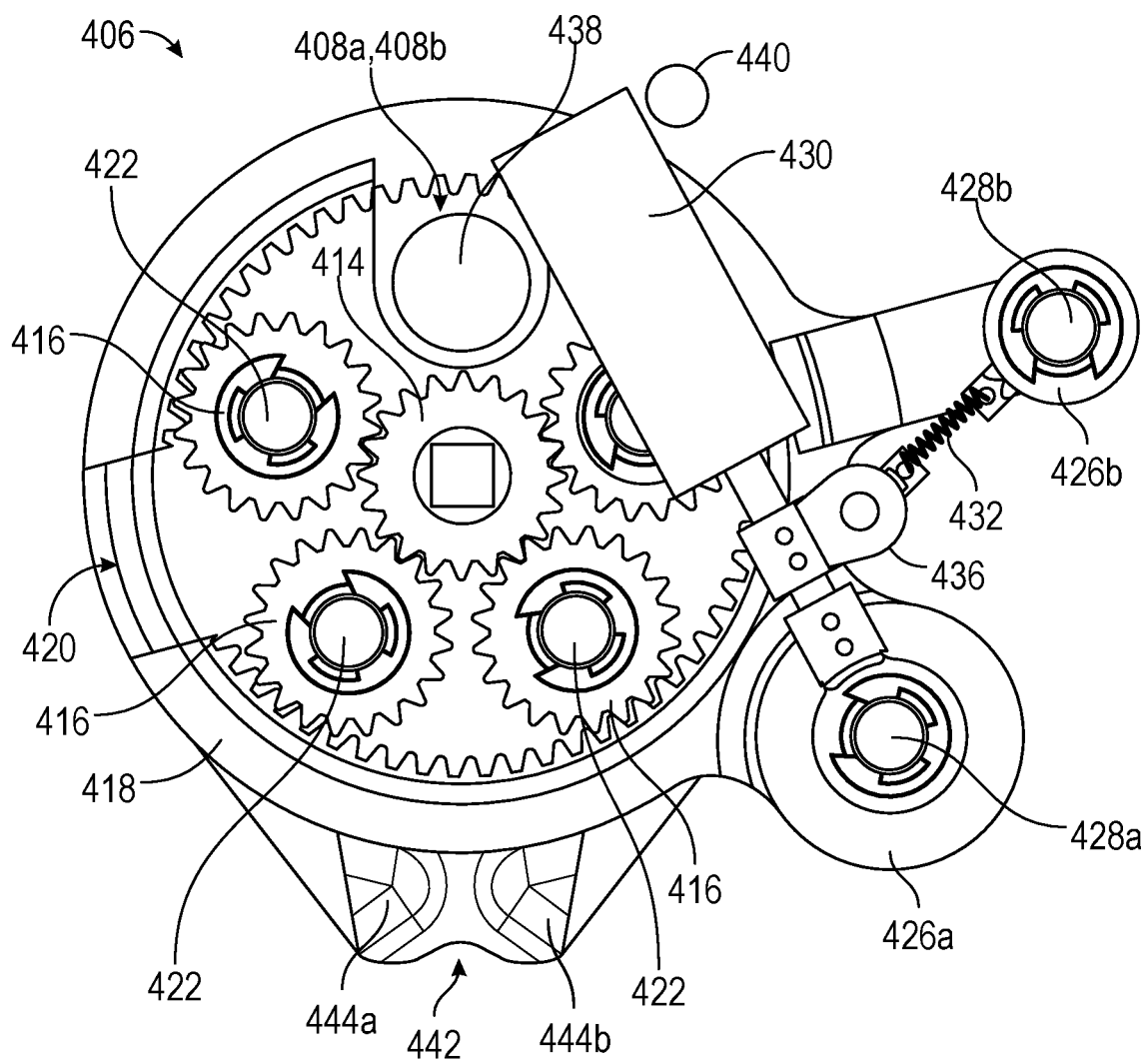
FIG. 4B illustrates a planar view of the rotary tool for some embodiments.
Figure 4C:
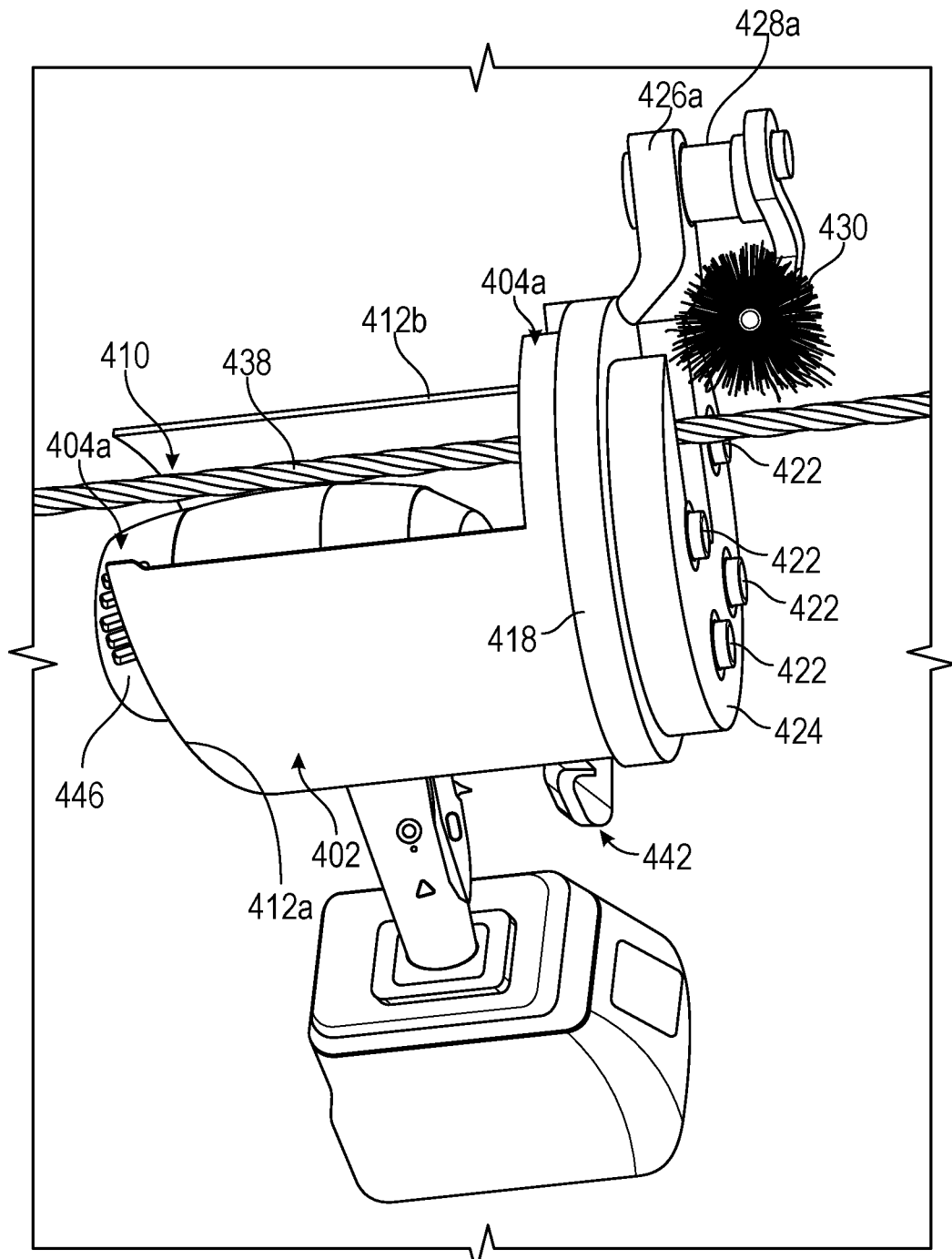
FIG. 4C illustrates the rotary tool operating on a power line for some embodiments.

Rotary tool 400 may comprise a housing 402 having a proximal end 404a and a distal end 404b. Proximal end 404a may be coupled to a drive system 406 and may present a slot 408a therein for receiving the conductor. Housing 402 may be substantially cylindrical and, as depicted, may present an opening 410 therein. In some embodiments, housing 402 comprises a first side wall 412a substantially opposite a second side wall 412b. In some embodiments, side walls 412a, 412b are substantially similar. In some embodiments, a motor for powering rotary tool 400 may be received in opening 410 and between side walls 412a, 412b (FIG. 4C). For example, a drill motor may be used to power drive system 406. In some embodiments, the drill is an impact drill operated by robot unit 302.

Drive system 406 may be configured as a planetary gear set comprising a sun gear 414 driving at least one planetary gear 416 that, in turn, drives a ring gear 418. Sun gear 414 may mesh with planetary gears 416, and planetary gears 416 may mesh with sun gear 414 and ring gear 418. Ring gear 418 may comprise a gap 420 therein in which the conductor may be received. In some embodiments, drive system 406 comprises four planetary gears 416. Additional or fewer planetary gears 416 may be used in drive system 406 without departing from the scope hereof. In some embodiments, the number of planetary gears 416 is in the range of two to eight planetary gears. Each planetary gear 414 may be coupled to a sleeve 422. In some embodiments, planetary gears 416 are coupled to a carrier. In some embodiments, planetary gears 416 are stationary with respect to the motor such that only sun gear 414 is directly driven by the actuation of the motor.

Rotary tool 400 may also comprise an outer plate 424 disposed proximally from drive system 406 such that drive system 406 is sandwiched between proximal end 404a and outer plate 424. For clarity of illustration, outer plate 424 is depicted transparently in FIG. 4A such that gears 414, 416, 418 are visible. In some embodiments, sleeves 422 extend from proximal end 404a through planetary gears 416 and outer plate 424 to secure proximal end 404a, drive system 406, and outer plate 424 together. Outer plate 424 may protect gears 414, 416, 418 from environmental wear and damage. Outer plate 424 may present a slot 408b therein for receiving the conductor. Slots 408a, 408b may be substantially similar. Slots 408a, 408b may be stationary and in-line with one another, while gap 420 rotates with ring gear 418. In some embodiments, slots 408a, 408b and gap 420 have a substantially similar width.

A first arm 426a and a second arm 426b may protrude from a perimeter of ring gear 418. Arms 426a, 426b may be proximal to one another on the perimeter of ring gear 418. For example, arms 426a, 426b may be separated at an angle of about 5 degrees to about 90 degrees. First arm 426a may comprise a first sleeve 428a extending substantially perpendicular therefrom. A rod 430 may be coupled to a distal end of the sleeve and extend across a face of outer plate 424. Thus, rod 430 may be substantially parallel to and laterally displaced from outer plate 424. As depicted in FIG. 4B, rod 430 may be inserted between the conductor and the wire tie to manipulate the wire tie. While rod 430 is depicted as a cylinder, it will be appreciated that rod 430 may take various other shapes without departing from the scope hereof. For example, rod 430 may be rectangular. In some embodiments, rod 430 comprises a wedge-shaped tip or a conical tip to aid in inserting rod 430 between the conductor and the wire tie. In some embodiments, rod 430 has a form-factor substantially similar to a screwdriver shaft.

Second arm 426b may comprise a second sleeve 428b extending substantially perpendicular therefrom. A spring 432 may extend from a bearing 434 disposed on a distal end of second sleeve 428b and couple to a connector 436 on rod 430. Therefore, as ring gear 418 rotates, the spring 432 may load rod 430 to keep rod 430 proximal to the conductor, and in between the conductor and the wire tie. Thus, as rod 430 is continuously rotated, rod 430 causes the wire tie to rotate around and unwrap from the conductor. As the position of rod 430 changes with the rotation of ring gear 418, spring 432 may expand and compress accordingly to keep rod 430 loaded against the conductor.

FIG. 4B illustrates a planar view of drive system 406 for some embodiments. As shown, a conductor 438 may be received within slots 408a, 408b and gap 420 with rod 430 inserted between conductor 438 and wire tie 440 such that rod 430 is proximal to conductor 438. In some embodiments, rod 430 is held in contact with conductor 438 by spring 432 throughout the rotation of ring gear 418. In some embodiments, robotic unit 302 is utilized to insert rod 430 between conductor 438 and wire tie 440. For example, a robotic arm 330a, 330b may utilize a gripper tool to loosen wire tie 440 off conductor 438 to allow for rod 430 to be inserted therebetween. In some embodiments, a robotic arm 330a, 330b or a human operator utilizes a pick tool (or other similar tool) to loosen wire tie 440 from conductor 438. Once loosened, rod 430 may be inserted between wire tie 440 and conductor 438. In some embodiments, after loosening wire tie 440 from conductor 438, robotic arm 330a, 330b may utilize the gripper tool to help insert rod 430 between conductor 438 and wire tie 440. In still other embodiments, rod 430 may comprise hook on a distal end thereof. The hook may be contoured to help engage with wire tie 440 and drag 440 onto rod 430. In some embodiments, the hook may be rotated at the distal end of rod 430 to engage with a free end of wire tie 440 (see FIG. 5C). Once engaged, wire tie 440 may be dragged onto rod 430 such that rod 430 is now wedged between conductor 438 and wire tie 440 and rotary tool 400 may be operated to manipulate wire tie 440. In some embodiments, rod 430 is wedged between conductor 438 and wire tie 440 without the use of an external tool.

In some embodiments, proximal end 404a comprises a die 442. The die 442 may be located near a bottom section of proximal end 404a, as shown. In some embodiments, die 442 is located near the top, or along any portion of proximal end 404a. Die 442 may comprise a first die section 444a and a second die section 444b. Die sections 444a may be substantially similar. In some embodiments, die sections 444a, 444b are configured to force wire tie 440 to bend at about a ninety degree angle such that wire tie 440 forms a coil as wire tie 440 is bent by die sections 444a, 444b. In some embodiments, die sections 444a, 444b may comprise a surface having a bend angle of about 45 degrees to about 135 degrees. In some embodiments, die sections 444a, 444b have distinct bend angles. As discussed above, as wire tie 440 is unwound from conductor 438, wire tie 440 becomes a floating piece of high voltage that presents a danger to the operator. As such, coiling wire tie 440 to become more compact may increase the safety of the operation by reducing the likelihood that the unwound portion of wire tie 440 comes in contact with the rotary tool, robot unit 302, or the lineman when rotary tool 400 is being operated at the pole top. In some embodiments, a robotic arm 330a, 330b is operated to feed wire tie 440 into die 442 as wire tie 440 is unwound from conductor 438. In other embodiments, die 442 is not used. For example, pre-formed wire ties often form into a predictable shape when unwound and may not present the danger or dielectric issue associated with non-pre-formed wire ties that unwind in an unpredictable manner.

FIG. 4C illustrates a second perspective view of rotary tool 400 for some embodiments. As discussed above, a motor 446 may be received within housing 402 and may be coupled to sun gear 414 to actuate drive system 406. In some embodiments, motor 446 is integrated with rotary tool 400 to power drive system 406. Conductor 438 may be received within slots 408a, 408b and gap 420 as rotary tool 400 operates. Rotary tool 400 may be advanced along conductor 438 as wire tie 440 is unwound.

As previously discussed, in some embodiments, rotary tool 400 may be used for cleaning conductor 438. Often, when performing maintenance on power lines, it is desirable to clean any corrosive material off the conductor 438. Typically, a hand-held wire brush is used, and a lineman manually scrub and abrades the corrosive material off the conductor. Such an operation is often performed when jumping a conductor to a transformer or from a first conductor to a second conductor, for example.

To abrade conductor 438 and remove corrosion or other material therefrom, rod 430 may comprise wire bristles or another abrasive material on an exterior thereof. In some embodiments, the wire bristles comprise stainless steel bristles. As discussed above, spring-loading rod 430 allows for rod 430 to be kept substantially in contact with wire tie 440 throughout the rotation of ring gear 418. Therefore, when rod 430 comprises wire bristles thereon, the wire bristles may abrade conductor 438 as rod 430 is rotated and is spring-loaded to be kept in contact with conductor 438. In some embodiments, rod 430 may be used to clean conductor 438 and simultaneously unwind wire tie 440. In other embodiments, wire tie 440 is unwound before cleaning conductor 438. In some embodiments, rod 430 is interchangeable such that a first rod may be used to unwind wire tie 440, and a second rod having wire bristles thereon can replace the first rod and be used to clean conductor 438. The first rod and the second rod may be stored on a tool changer of the robotic unit, 302 for example.

Figure 5A:
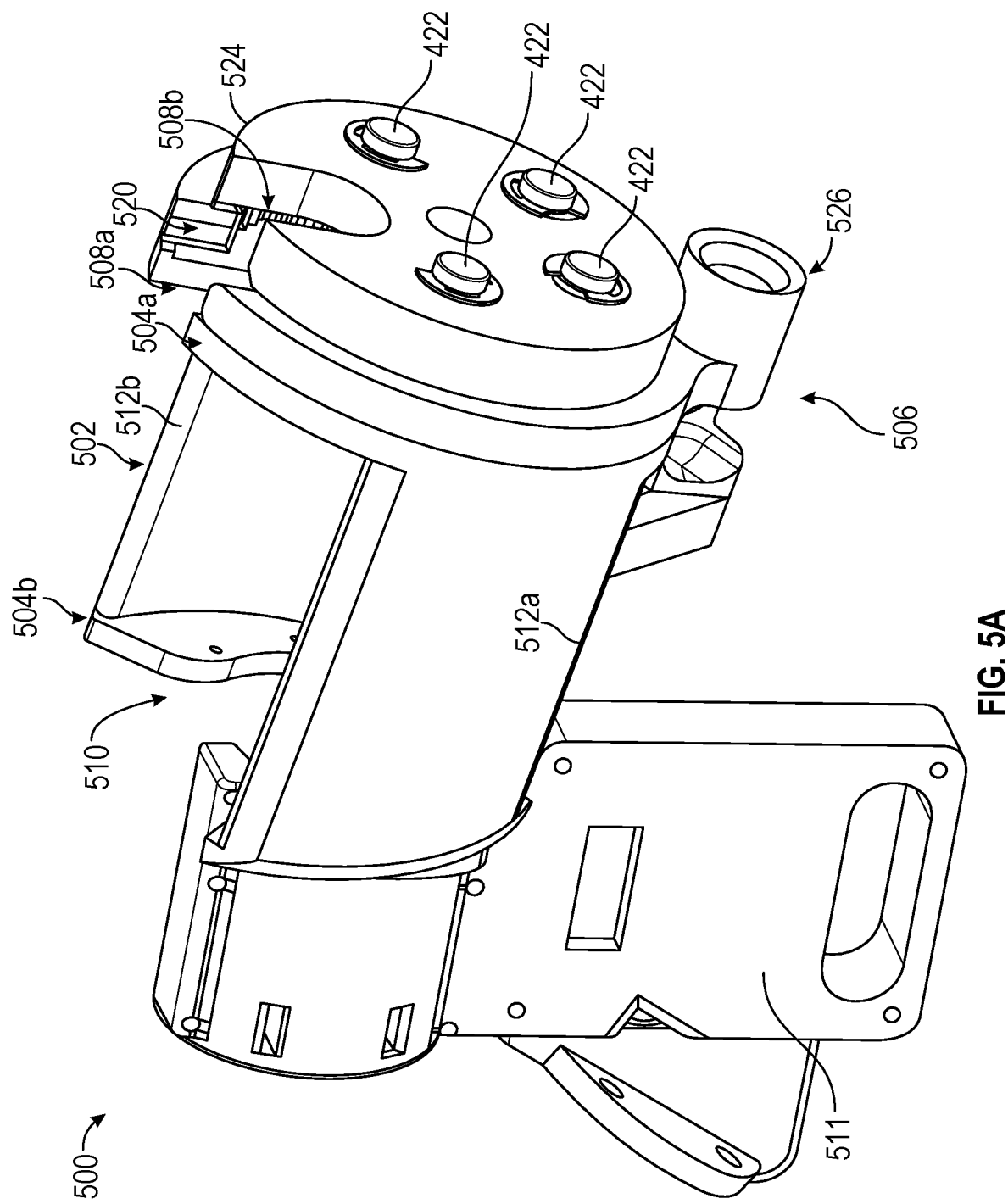
FIG. 5A illustrates a perspective view of a second embodiment of the rotary tool.

FIG. 5A illustrates a perspective view of a second embodiment of the rotary tool for some embodiments, designated as rotary tool 500.

Rotary tool 500 may comprise a housing 502 having a proximal end 504a and a distal end 504b. Housing 502 may be substantially similar to housing 402, presenting an opening 510 therein for the insertion of a motor 446 to drive a drive system 506. In some embodiments, housing 502 comprises a first side wall 512a opposite a second side wall 512b. In some embodiments, rotary tool 500 comprises a handle 511. Handle 511 may allow a lineman to hold and operate rotary tool 500 for manual operation. In some embodiments, handle 511 is omitted from rotary tool 500, such as when rotary tool 500 is operated by robotic unit 302.

Figure 5B:
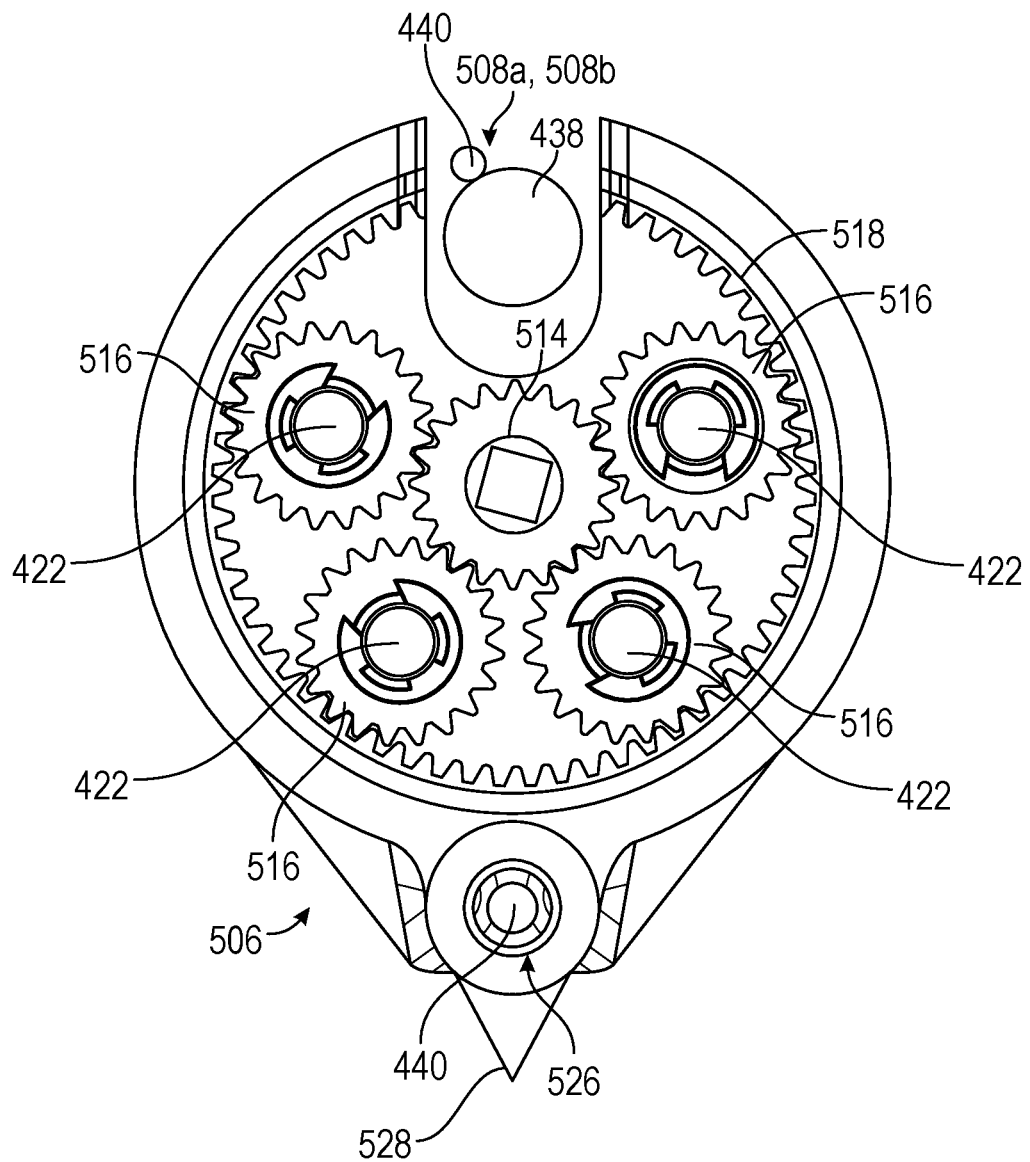
FIG. 5B illustrates a planar view of the second embodiment of the rotary tool.

Proximal end 504a may be coupled to drive system 506 and may present a slot 508a therein for receiving a conductor 438. Drive system 506 may be substantially similar to drive system 406. In some embodiments, drive system 506 is coupled to an outer housing 524, which may present a slot 508b. As illustrated in FIG. 5B, in some embodiments, drive system 506 comprises a sun gear 514 driving one or more planetary gears 516 that, in turn, drive a ring gear 518. In some embodiments, ring gear 518 comprises a receiving arm 526 on a perimeter thereof. Receiving arm 526 may be substantially cylindrical and comprise a hole therethrough to receive a free end 530 of wire tie 440. Receiving arm 526 rotates with ring gear 518, thereby rotating wire tie 440 about conductor 438 and unwinding wire tie 440 therefrom. Receiving arm 526 may also be used to wind wire tie 440 about a conductor 438. For example, drive system 506 may be driven in a first direction to unwind wire tie 440 and driven in a second direction to wind wire tie 440 about conductor 438. As wire tie 440 is wound or unwound about wire tie conductor 438, rotary tool 500 may be advanced along the conductor 438.

Looking now at FIG. 5B, a planar view of drive system 506 is depicted for some embodiments. As described above, drive system 506 may be substantially similar to drive system 406 and comprise a set of gears configured to rotate wire tie 440 about the conductor 438 to tie or untie the wire tie 440 therefrom. A sun gear 514 may be located substantially in a center of drive system 506. Sun gear 514 may be coupled to motor 446, such as via a shaft (not shown). A plurality of planetary gears 516 may be coupled to sun gear 514. In some embodiments, the plurality of planetary gears 516 comprises in the range of two to eight planetary gears. Each planetary gear 516 may be stationary with respect to motor 446.

A ring gear 518 may be coupled to planetary gears 516. In some embodiments, the ring gear 518 is circumferential about sun gear 514. Ring gear 518 may comprise a gap 520 therein. In some embodiments, slots 508a, 508b and gap 520 receive conductor 438, such that conductor 438 lies within slots 508a, 508b and gap 520. Slots 508a, 508b may be stationary while gap 520 rotates with ring gear 518. Ring gear 518 may be coupled to receiving arm 526 such that rotation of ring gear 518 rotates receiving arm 526.

When motor 446 is actuated, sun gear 514 may be driven and rotated. Sun gear 514 drives planetary gears 516, which, in turn, drive ring gear 518. As ring gear 518 rotates, receiving arm 526 and wire tie 440 held therein are rotated about the conductor 438, which is held substantially stationary within slots 508a, 508b. Thus, wire tie 440 may be wrapped or unwrapped about conductor 438, depending on a direction of rotation of drive system 506. For example, rotating ring gear 518 in a first direction about conductor 438 may unwind wire tie 440 therefrom, while rotating ring gear 518 in a second direction that is opposite the first direction may wind wire tie 440 about conductor 438.

Also illustrated in FIG. 5B is a cutter 528. As previously described, as wire tie 440 is unwrapped from conductor 438 and physically separated therefrom, the unwound portion maintains the high voltage of conductor 438. Because the unwound portion of wire tie 440 is no longer tied to conductor 438, the unwound portion may be susceptible to being blown by the wind and may be blown into the lineman, the robot, and other grounded components (e.g., steel cross-arms, poles, phases, etc.), thereby presenting a danger to the operations. Therefore, in some embodiments rotary tool 500 comprises cutter 528 to shear off the unwound portion of wire tie 440. Cutter 528 may be disposed behind receiving arm 526 such that, as wire tie 440 is fed through receiving arm 526, wire tie 440 is then cut by cutter 528. Thus, for each rotation of ring gear 518, the portion of wire tie 440 that was unwound is then sheared off and does not present a danger to the surroundings. Cutter 528 may be a stationary metal blade and in the rotating path of drive system 506 such that the motor 446 can drive the shearing action thereof. Once cut, the cut portion of wire tie 440 no longer has the high voltage and does not present a danger to the lineman or robotic equipment. In some embodiments, cutter 528 is configured to cut wire tie 440 one time per revolution of ring gear 518. In some embodiments, cutter 528 makes two or more cuts per revolution of ring gear 518. In other embodiments, cutter 528 may make a single cut per two or more revolutions of ring gear 518. Cutter 528 may be coupled to housing 502, as shown. In some embodiments, cutter 528 protrudes from proximal end 504a. In some embodiments, the dexterous arm of the robot is configured to cut or coil the unwound portion of wire tie 440. In some embodiments, rotary tool 400, 500 is configured to catch the cut portion of wire tie 440. For example, a receptacle may be used to catch the cut portion. Alternatively, or additionally, magnets may be used. In some embodiments, a robotic arm 330a, 330b operates a receptacle or other receiving device to catch the cut portions.

It should be noted that rotary tool 500 may also comprise die 442, and free end 530 of wire tie 440 may be fed through receiving arm 526 to die 442 to bend wire tie 440 into a coil. Similarly, rotary tool 400 may comprise cutter 528 without departing from the scope hereof. The use of a cutter 528 may be advantageous for cutting wire ties 440 made from softer material (e.g., aluminum or copper). The use of die 442 may be advantageous for harder materials (e.g., steel) and/or for wire ties having a gauge size that makes cutting the wire tie difficult. In some embodiments, rotary tool 400, 500 comprises both a die 442 and a cutter 528, and either or both of die 442 and cutter 528 may be employed while manipulating wire ties.

Figure 5C:
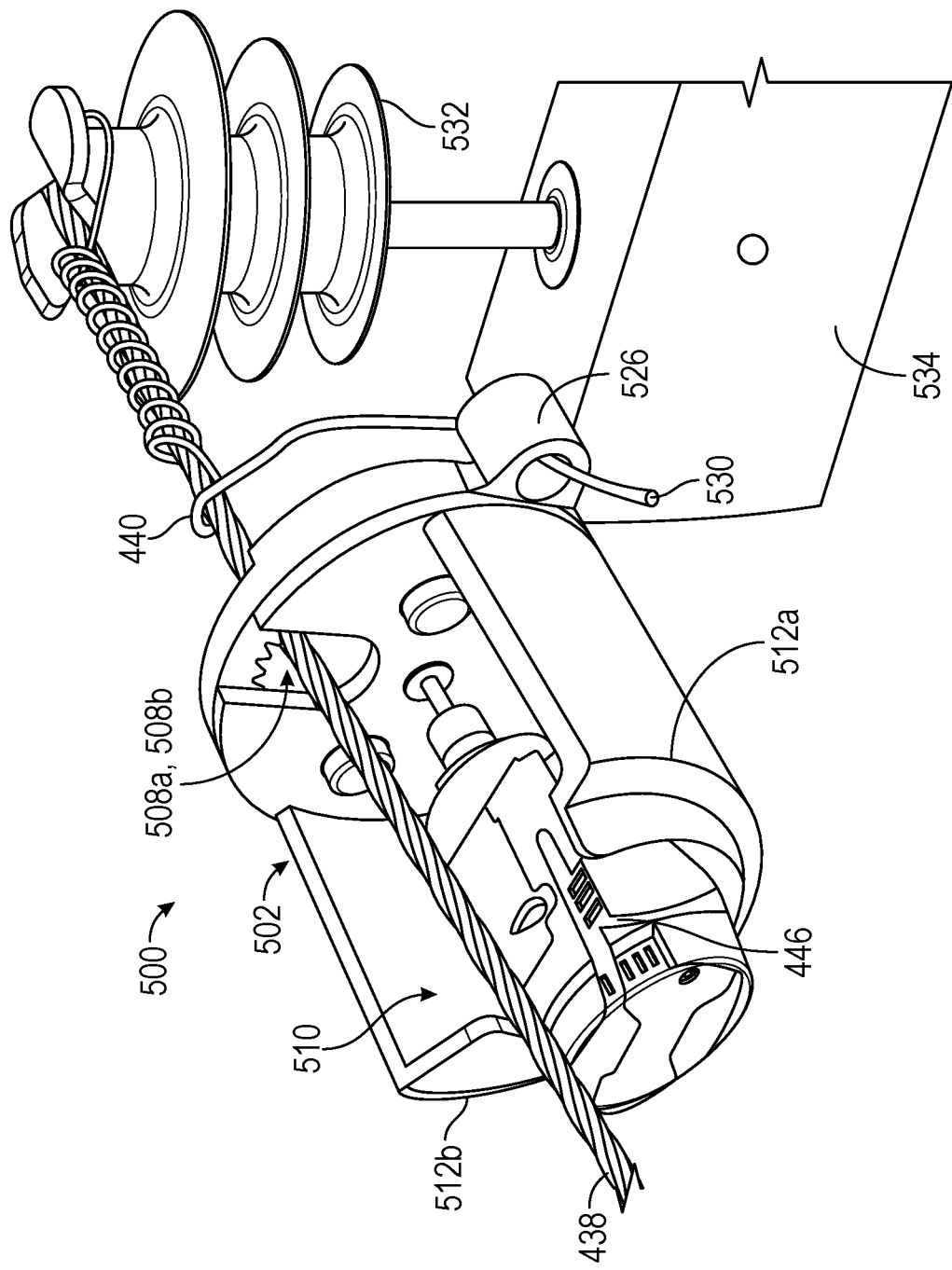
FIG. 5C illustrates the second embodiment of the rotary tool operating on a power line.

FIG. 5C illustrates rotary tool 500 unwrapping a wire tie 440 wrapped around conductor 438 for some embodiments. As discussed above, wire ties 440 are often wrapped around conductors to secure the conductors to insulators 532 that are disposed on a cross-arm 534 atop a utility pole (not shown).

In some embodiments, robot unit 302 is configured to unwind the wire tie 440 from conductor 438 to a predefined distance from insulator 532. For example, the remote assembly system 300 may operate until a distal end of rotary tool 500 reaches the predefined distance to prevent crashing into insulators 532. In some embodiments, remote capture device 210 is configured to perform object detection to determine how far away rotary tool 500 is from insulator 532. When rotary tool 500 is at or proximal to the predefined distance, remote assembly system 300 may pull a remaining portion of wire tie 440 off insulators 532. For example, the predefined distance may be set such that the wire tie is able to be pulled off insulator 532 using a gripper tool or the like operated by a utility arm 330a, 330b.

While embodiments herein have been described with respect to using rotary tool 400, 500 on live power lines, rotary tool 400, 500 may be used to manipulate wires in various applications. For example, rotary tool 400, 500 may be manually operated to wind or unwind a first wire about a second wire, or a wire about any object that can be received within the slots 408a, 408b, 508a, 508b of rotary tool 400, 500. In some embodiments, the wire tie is first tied to an insulator (e.g., using utility arms 330a, 330b) before being wound about the conductor. It will be appreciated that rotary tool 400, 500 may be sized based on the object that a wire is wound or unwound about. For example, for objects larger than a conductor on an energized power line the size of rotary tool 400, 500 may be increased to fit the object within the slots.

The following U.S. patent applications, each filed Jul. 28, 2022, are each hereby incorporated by reference in their entirety as if set forth herein verbatim: U.S. Application Ser. No. 63/392,927, titled "REDUCING LATENCY IN HEAD-MOUNTED DISPLAY FOR THE REMOTE OPERATION OF MACHINERY"; U.S. Application Ser. No. 17/875,674, titled "MANUAL OPERATION OF A REMOTE ROBOT ASSEMBLY"; U.S. Application Ser. No. 17/875,710, titled "AUTONOMOUS AND SEMI-AUTONOMOUS CONTROL OF AERIAL ROBOTIC SYSTEMS"; U.S. Application Ser. No. 17/875,796, titled "COOPERATIVE HIGH-CAPACITY AND HIGH-DEXTERITY MANIPULATORS"; U.S. Application Ser. No. 17/875,821, titled "OPERATION AND INSULATION TECHNIQUES"; U.S. Application Ser. No. 17/875,893, titled "COORDINATE MAPPING FOR MOTION CONTROL"; U.S. Application Ser. No. 17/875,943, titled "WIRE TENSIONING SYSTEM"; U.S. Application Ser. No. 17/875,990, titled "CROSS-ARM PHASE-LIFTER"; and U.S. Application Ser. No. 63/393,047, titled "ELECTRICALLY INSULATING BLANKET WITH MEMORY SET". The subject matter described in the foregoing U.S. patent applications may be combined with the subject matter of the present disclosure. For example, one or more embodiments, features, structures, acts, etc. described in any one or more of the foregoing U.S. patent applications may be combined with one or more embodiments, features, structures, acts, etc. described in the present disclosure.

Although the present teachings have been described with reference to the embodiments illustrated in the attached drawing figures, it is noted that equivalents may be employed, and substitutions made herein without departing from the scope of the present teachings as recited in the claims.

Having thus described various embodiments, what is claimed as new and desired to be protected by Letters Patent includes the following:

The invention claimed is:

1. A system for remotely manipulating wire ties on energized power lines, the system comprising:
   a robot unit mounted to a boom assembly, comprising:
      at least one robotic arm for performing an action; and
      at least one camera for capturing visual information; and
   a rotary tool driven by the robot unit, comprising:
      a housing coupled to the at least one robotic arm, the housing comprising a slot for receiving a conductor therein;

a drive system coupled to the housing, the drive system comprising a planetary gear set, and a spring-loaded rod coupled to a ring gear of the planetary gear set, wherein the spring-loaded rod is configured to be inserted between the conductor and a wire tie wound around the conductor, wherein when the robot unit drives the drive system, the ring gear of the planetary gear set is rotated around the conductor and drives the planetary gear set, thereby rotating the spring-loaded rod to unwind the wire tie from the conductor.

2. The system of claim 1,
wherein the ring gear comprises a first arm coupled to a rod and a second arm coupled to a spring, and
wherein the spring is coupled to the rod to spring-load the rod to keep the rod proximal to the conductor as the ring gear rotates.

3. The system of claim 1,
wherein the at least one robotic arm comprises a first robotic arm and a second robotic arm,
wherein the first robotic arm is coupled to the rotary tool, and
wherein the second robotic arm comprises a gripper to manipulate the wire tie for inserting the rod between the conductor and the wire tie.

4. The system of claim 1,
wherein the rod comprises an abrasive material on an exterior thereof for removing corrosion from the conductor.

5. The system of claim 1,
wherein the ring gear comprises a receiving portion having a hole therethrough and extending from a perimeter of the ring gear, and
wherein the receiving portion receives a free end of the wire tie and is rotated with the ring gear to unwind the wire tie from the conductor.

6. The system of claim 5,
wherein the receiving portion is configured to feed an unwound portion of the wire tie to a cutter,
wherein the cutter cuts the unwound portion of the wire tie to remove the unwound portion of the wire tie from an energized portion of the wire tie.

7. The system of claim 5,
wherein the receiving portion is configured to feed an unwound portion of the wire tie to a die,
wherein the die bends the unwound portion of the wire tie to form the unwound portion of the wire tie into a coil.

8. The system of claim 1,
wherein the drive system is driven by one of an impact drill or an integrated motor.

9. A rotary tool for remotely operating on live power lines, comprising:
a housing comprising a first slot for receiving a conductor therein;
a drive system coupled to the housing, the drive system comprising:
a sun gear configured to be coupled to a motor;
a plurality of planetary gears meshed with the sun gear; and
a ring gear meshed with the plurality of planetary gears; and
a spring-loaded rod coupled to the ring gear,
wherein the spring-loaded rod is configured to be inserted between the conductor and a wire tie wound around the conductor, and wherein when the drive system is driven by the motor, the ring gear is rotated by the sun gear and drives the plurality of planetary gears, thereby rotating the spring-loaded rod to unwind the wire tie from the conductor.

10. The rotary tool of claim 9, wherein the housing further comprises a cutter for cutting an unwound portion of the wire tie as the wire tie is unwound from the conductor.

11. The rotary tool of claim 9, wherein the housing further comprises a die, the die formed to bend the wire tie into a coil as the wire tie is fed through the die.

12. The rotary tool of claim 11, wherein a surface of the die comprises an angle of about ninety degrees.

13. The rotary tool of claim 9,
wherein the ring gear comprises a first arm and a second arm extending from a perimeter thereof,
wherein the spring-loaded rod is coupled to the first arm,
wherein a spring is coupled to the second arm, and
wherein the spring extends from the second arm and couples to the spring-loaded rod to keep the spring-loaded rod in contact with the conductor as the ring gear rotates.

14. The rotary tool of claim 13, wherein the spring-loaded rod comprises a plurality of wire bristles on an exterior surface thereof to clean the conductor.

15. A rotary tool for remotely operating on live power lines, comprising:
a housing comprising a slot for receiving a conductor therein;
a drive system, the drive system comprising:
a sun gear configured to be coupled to a motor for driving the drive system;
a plurality of planetary gears meshed with the sun gear, wherein the plurality of planetary gears is driven by the sun gear; and
a ring gear meshed with and driven by the plurality of planetary gears,
wherein the ring gear comprises a receiving portion extending away from an outer perimeter of the ring gear for receiving a free end of a wire tie therein, and
wherein actuation of the drive system causes the ring gear to rotate around the conductor, thereby unwinding the wire tie from the conductor, and
a spring-loaded rod coupled to a ring gear of the plurality of planetary gears,
wherein the spring-loaded rod is configured to be inserted between the conductor and the wire tie wound around the conductor,
wherein when the drive system is driven by the motor, the ring gear is rotated by the sun gear and drives the plurality of planetary gears, thereby rotating the spring-loaded rod to unwind the wire tie from the conductor.

16. The rotary tool of claim 15, wherein the housing is configured to couple to a first arm of a robotic unit.

17. The rotary tool of claim 15, wherein the plurality of planetary gears is in a range of two to eight.

18. The rotary tool of claim 17,
wherein the housing comprises a cutter disposed proximal to the receiving portion,
wherein the cutter cuts the wire tie after the wire tie is fed through the receiving portion.

19. The rotary tool of claim 18, wherein the cutter is configured to make one cut per revolution of the ring gear.

20. The rotary tool of claim 17,
wherein the housing comprises a die disposed proximal to the receiving portion, wherein the die forms the wire tie into a bend after the wire tie is fed through the receiving portion.

* * * * *